United States Patent [19]

Bradley

[11] Patent Number: 4,459,260
[45] Date of Patent: Jul. 10, 1984

[54] DRY STORAGE OF IRRADIATED NUCLEAR FUEL

[75] Inventor: Norman Bradley, Culcheth, England

[73] Assignee: National Nuclear Corporation Limited, London, England

[21] Appl. No.: 348,225

[22] Filed: Feb. 12, 1982

[30] Foreign Application Priority Data

Mar. 3, 1981 [GB] United Kingdom ............... 8106583

[51] Int. Cl.³ .......................................... G21C 19/02
[52] U.S. Cl. ..................................... 376/272; 376/293
[58] Field of Search ............................. 376/272, 293

[56] References Cited

U.S. PATENT DOCUMENTS 3,446,171  5/1969  Panoff et al. ...................... 376/293
4,299,659  11/1981 Hame et al. ....................... 376/272
4,356,146  10/1982 Knappe et al. .................... 376/272

FOREIGN PATENT DOCUMENTS 2711405  9/1978  Fed. Rep. of Germany ...... 376/272
2837839  4/1980  Fed. Rep. of Germany ...... 376/272
1353100  1/1964  France ............................... 376/272
 862624  3/1961  United Kingdom ................ 376/272
1583303  1/1981  United Kingdom .

OTHER PUBLICATIONS

Proc. of 23rd Conf. on Remote Systems Technology, 1975, San Francisco, Calif., pp. 109–126, Swanson et al.

Primary Examiner—Harvey E. Behrend
Attorney, Agent, or Firm—William R. Hinds

[57] ABSTRACT

A concrete cell structure for storing irradiated nuclear fuel has air inlets in the roof and a stack for effecting natural draught ventilation. Air flows through the cells in heat exchange with nuclear fuel containers. The concrete cell structure is housed within a steel framed and sheeted weather tight building which provides a large air plenum for the inlet ports and thereby avoids serious pressure variations at the inlets caused by wind loadings.

3 Claims, 3 Drawing Figures

DRY STORAGE OF IRRADIATED NUCLEAR FUEL

This invention relates to the dry storage of irradiated nuclear reactor fuel and highly active waste.

When fuel is withdrawn from a nuclear reactor it is highly radioactive and is usually stored for a period of at least 100 days in a cooling pond; the pond water serves to contain the radioactivity and to absorb the heat energy generated by decay of fission products. Pond water cooling is not attractive for long term storage of irradiated nuclear fuel, for example 50 to 100 years, because corrosion of the fuel cladding can occur and there are difficulties in maintaining the pool. An alternative method of storing irradiated nuclear fuel and highly active waste for the long term is to deposit the fuel or waste in concrete cells and cool it by circulating air. Preferably the circulation is effected by a passive system such as natural draught ventilation so that maintenance and reliability problems are minimised.

Natural draught ventilation may be effected by a stack mounted on the roof of the cell construction, air being drawn through an inlet port disposed in the side, but variations in the relative inlet and outlet air pressures caused by wind loadings are considered to be too severe for irradiated nuclear fuel storage where excessively high temperatures caused by insufficient cooling will adversely affect the stored fuel and the concrete structure.

An object of the invention is to provide a dry storage cell construction for irradiated nuclear fuel wherein the inlet port for natural draught ventilation is not adversely affected by wind loading.

According to the invention in a construction of dry storage cell for irradiated nuclear fuel or for highly active waste wherein cooling air is flowed by natural draught ventilation through the cell by way of an inlet port and an outlet stack mounted on the roof structure of the cell, there is a ported shroud enveloping the cell structure with inlet port thereby to form, in combination with the cell structure, an inlet plenum for the cell the shroud being penetrated by the outlet stack.

The shroud protects the inlet port from wind variations and, conveniently, may consist of a steel-framed and sheeted weathertight building enclosing the cell structure. A dry storage cell construction for irradiated nuclear fuel or highly active waste and embodying the invention is described, by way of example, with reference to the accompanying drawings wherein.

Figure 2:
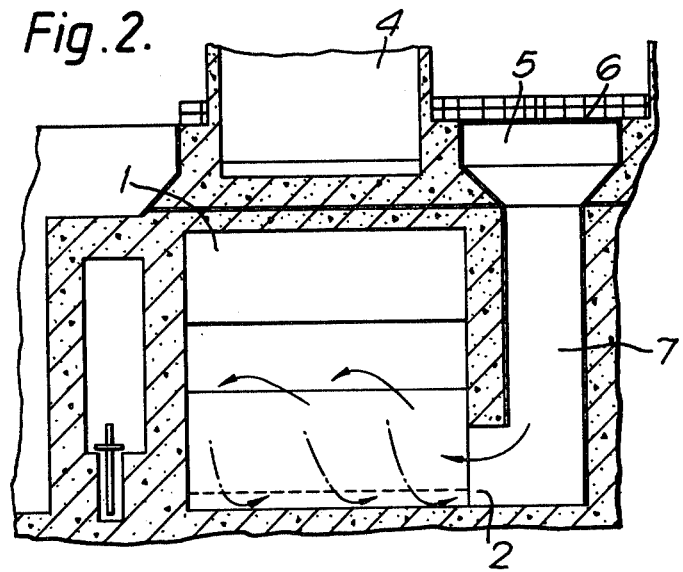
FIG. 2 is a sectional view on line II—II of FIG. 1.
Figure 1:
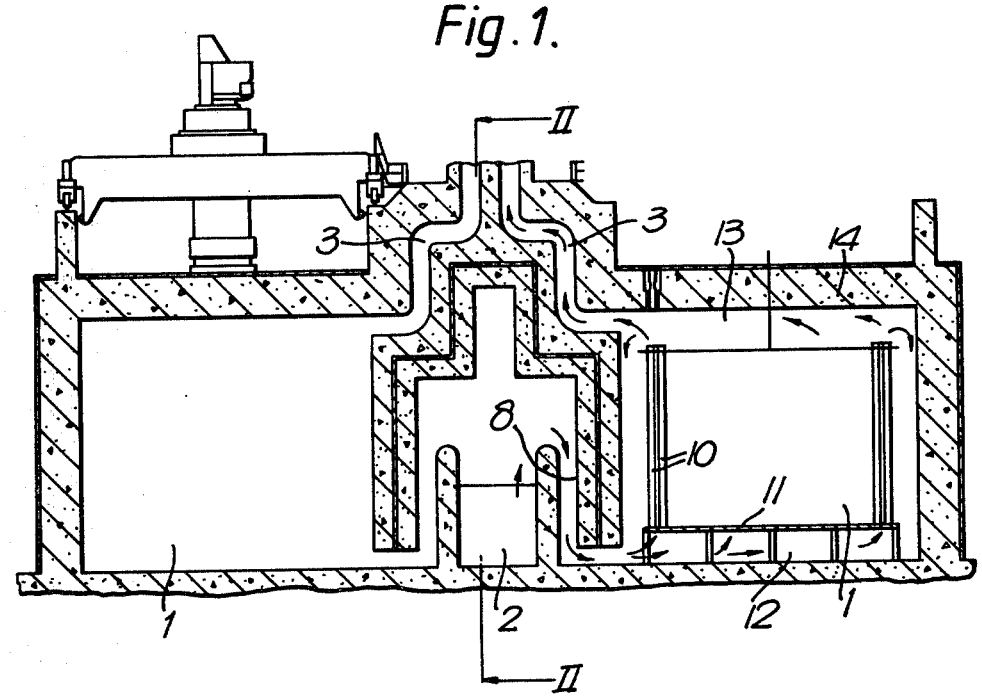
FIG. 1 is a sectional view of a cell structure.
Figure 3:
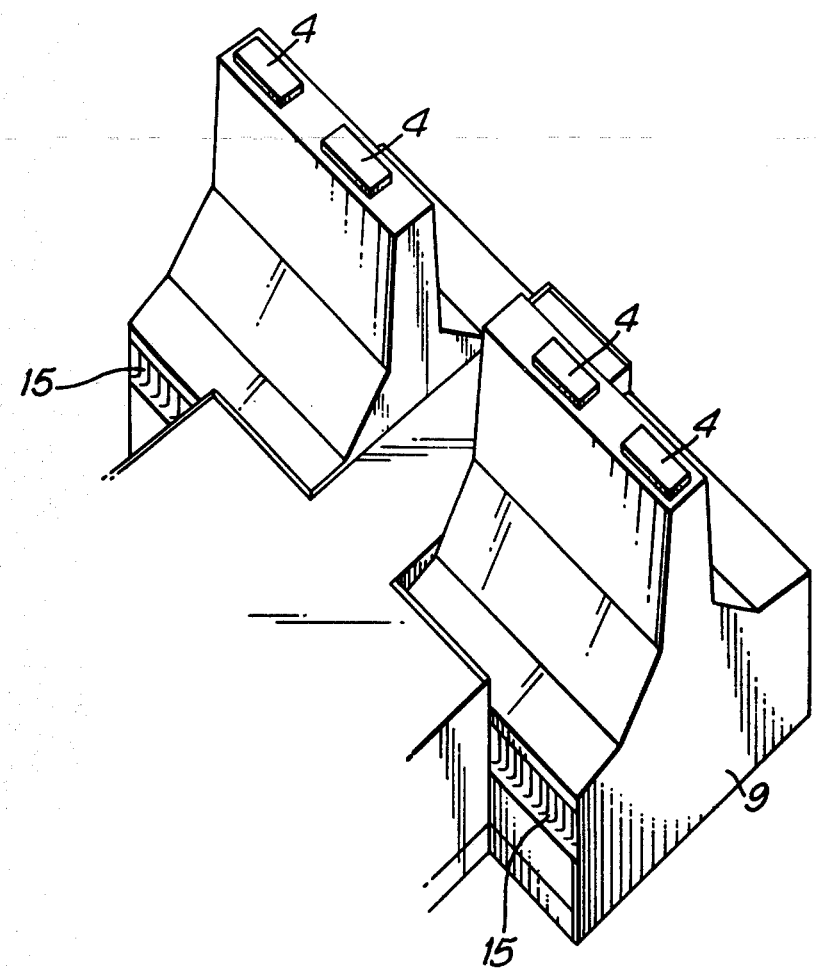
FIG. 3 is an architectural view of a building housing the cell structure.

The cell structure shown in FIGS. 1 and 2 comprises a pair of concrete cells 1 disposed one on each side of an air inlet duct 2. The cells 1 exit by way of ducts 3 to a stack 4 so that a natural circulation of air through the cells is effected. The air intake designated 5, which is common to both cells, is by way of a coarse mesh grill 6 disposed in the roof of the cell structure and is fed to the duct 2 down a shaft 7 as shown in FIG. 2. The air flow from the duct 2 into the cells is through side inlet ports, by way of a labyrinth type baffle 8 and the exit ducts 3 are of dog-leg form to prevent direct radiation streaming. The cell structure with air intake 5 is housed within a steel-framed and sheeted weathertight building 9 (shown in FIG. 3) which forms a ported shroud for the cell structure with air intake 5 and cell inlet ports. The shroud has air inlet ports designated 15 and, in combination with the cell structure forms an air inlet plenum which protects the cell inlet ports from wind variations. The outlet stack 4 penetrates the roof of the building. The fuel to be stored in the cells is enclosed within cylindrical steel canisters in an array of 650 vertical steel cooling channel tubes 10. The lower ends of the tubes are supported in a perforated concrete raft 11 set above the floor, the interspace constituting an air inlet mixing plenum 12. The upper ends of the tubes 10 are located in a grid matrix with an air space 13 between the top of the tubes and the underside of a slab 14. The fuel containing canisters are loaded into the steel channel tubes 10 two per tube stacked two high. The residual heat from the fuel produces natural draught in the annulus between the canisters and the tube and the induced forced convection flow removes heat from the canister wall keeping the enclosed fuel at an acceptable temperature.

I claim:

1. A construction of dry storage cell for irradiated nuclear fuel, comprising a hollow structure defining at least one chamber for containing irradiated nuclear fuel, said structure having at least one air inlet from the exterior of the structure to said chamber, an elongate stack mounted on the top of said structure and forming an outlet from said chamber, and an enclosure enveloping said structure with clearance so as to provide a large inlet air plenum between said enclosure and said structure for avoiding serious pressure variations at said chamber inlet caused by wind loadings and variations, said enclosure having at least one air inlet from the exterior of the enclosure to said large inlet air plenum, said elongate stack extending from the top of said structure and penetrating said enclosure so as to open exteriorly of said enclosure, whereby natural draft ventilation is generated by said stack and causes air to enter said large plenum from ambient via the inlet of the enclosure, to pass from said plenum to said chamber via the inlet of said structure, to pass through said chamber for removing decay heat from said irradiated nuclear fuel, and to leave via said stack.

2. A construction as claimed in claim 1, wherein said structure has an air inlet in the roof thereof and incorporating a coarse filter, a shaft from said roof air inlet extending downwardly to a duct, said duct communicating via a labyrinth baffle with said chamber for passing air upwardly over irradiated nuclear fuel mounted in spaced vertically-oriented relationship in said chamber, and exit ducting for passing the air from the chamber to said elongate stack which extends upwardly from the roof of said structure and through said enclosure.

3. A construction as claimed in claim 1, wherein said enclosure comprises a steel-framed and sheeted weather-tight building.

* * * * *